(12) United States Patent
Skinner et al.

(10) Patent No.: US 9,915,145 B2
(45) Date of Patent: Mar. 13, 2018

(54) DOWNHOLE POWER AND DATA TRANSFER USING RESONATORS

(71) Applicant: HALLIBURTON ENERGY SERVICES, INC., Houston, TX (US)

(72) Inventors: Neal Gregory Skinner, Lewisville, TX (US); Etienne Samson, Cypress, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/038,894

(22) PCT Filed: Mar. 6, 2014

(86) PCT No.: PCT/US2014/021097
§ 371 (c)(1),
(2) Date: May 24, 2016

(87) PCT Pub. No.: WO2015/134021
PCT Pub. Date: Sep. 11, 2015

(65) Prior Publication Data
US 2017/0167250 A1    Jun. 15, 2017

(51) Int. Cl.
*E21B 47/16* (2006.01)
*E21B 47/01* (2012.01)
(Continued)

(52) U.S. Cl.
CPC .............. *E21B 47/16* (2013.01); *H02J 50/12* (2016.02)

(58) Field of Classification Search
CPC ...... E21B 47/028; E21B 47/16; E21B 47/122; G01V 3/28; G01V 11/002; G02B 6/12007; H01F 38/14; H01P 7/00; H02J 5/005; H02J 7/025; H02J 17/00; H02J 50/12; H04B 5/00; H04B 5/0031; H04B 5/0037; H04B 5/0081; H04B 5/0093; H04B 2203/5475
(Continued)

(56) References Cited

U.S. PATENT DOCUMENTS 1,119,732 A    12/1914  Tesla et al.
4,928,088 A *  5/1990  Jorion .................. E21B 47/122
                                                        175/40
(Continued)

FOREIGN PATENT DOCUMENTS

WO    2014027322    2/2014

OTHER PUBLICATIONS

Australian Patent Application No. 2014385258, First Examiner Report, dated Sep. 10, 2016, 2 pages.
(Continued)

*Primary Examiner* — Quan-Zhen Wang
*Assistant Examiner* — Stephen Burgdorf
(74) *Attorney, Agent, or Firm* — Kilpatrick Townsend & Stockton LLP (57) ABSTRACT

A downhole system usable with a well string is provided that can include a first resonator positioned on the well string. The system can also include a second resonator positioned to couple with the first resonator by an evanescent field. The second resonator can include a load. Further, the system can include a metamaterial positioned between the first resonator and the second resonator for amplifying or extending a range of the evanescent field.

16 Claims, 6 Drawing Sheets

(51) Int. Cl.
*H02J 17/00* (2006.01)
*H02J 50/12* (2016.01)

(58) Field of Classification Search
USPC .......................................................... 367/82
See application file for complete search history.

(56) References Cited

U.S. PATENT DOCUMENTS

| | | | |
|---|---|---|---|
| 5,008,664 A * | 4/1991 | More | E21B 34/16 |
| | | | 166/66 |
| 5,052,941 A | 10/1991 | Hernandez-Marti et al. | |
| 5,971,072 A | 10/1999 | Huber et al. | |
| 6,866,306 B2 | 3/2005 | Boyle et al. | |
| 7,775,275 B2 | 8/2010 | Patel et al. | |
| 7,889,127 B2 * | 2/2011 | Sajuyigbe | H01Q 19/025 |
| | | | 342/372 |
| 8,082,983 B2 | 12/2011 | Patel et al. | |
| 2002/0163441 A1 * | 11/2002 | Hill | E21B 47/12 |
| | | | 340/855.4 |
| 2008/0201080 A1 | 8/2008 | Lovell et al. | |
| 2009/0058675 A1 | 3/2009 | Sugiura et al. | |
| 2010/0264747 A1 | 10/2010 | Hall et al. | |
| 2011/0133568 A1 * | 6/2011 | Wang | H02J 17/00 |
| | | | 307/104 |
| 2011/0226470 A1 | 9/2011 | Latrille et al. | |
| 2012/0007442 A1 * | 1/2012 | Rhodes | H01F 38/14 |
| | | | 307/104 |
| 2012/0038219 A1 | 2/2012 | Wang et al. | |
| 2012/0105970 A1 * | 5/2012 | Ueda | G02B 1/002 |
| | | | 359/642 |
| 2012/0112554 A1 * | 5/2012 | Kim | H02J 5/005 |
| | | | 307/104 |
| 2013/0075087 A1 | 3/2013 | Algeroy et al. | |
| 2013/0140908 A1 | 6/2013 | Wang et al. | |
| 2013/0186641 A1 | 7/2013 | Lovell et al. | |
| 2013/0293029 A1 | 11/2013 | Hudson et al. | |
| 2014/0175893 A1 * | 6/2014 | Sengupta | H02J 17/00 |
| | | | 307/104 |

OTHER PUBLICATIONS

"Information on Frequency Selective Surfaces", at least as early as Apr. 10, 2015, 65 pages.
Karalis et al., EfficientWireless Non-Radiative Mid-Range Energy Transfer, Apr. 27, 2007, 15 pages.
International Patent Application No. PCT/US2014/021097, International Search Report and Written Opinion, dated Nov. 28, 2014, 14 pages.
Rao et al., Amplification of Evanescent Waves in a Lossy Left-Handed Material Slab, Jun. 16, 2003, 4 pages.
Sibakoti et al., Wireless Power Transmission Using Magnetic Resonance, Dec. 2011, 13 pages.
Skinner, Review of Traditional Frequency Selective Surfaces—Chapter 2, at least as early as Apr. 10, 2015, 6 pages.
Wang et al., Experiments on Wireless Power Transfer with Metamaterials, Jun. 2011, 5 pages.
Wang et al., Metamaterials for Wireless Power Transfer, Mar. 2012, 6 pages.
Wang et al., Wireless Power Transfer with Metamaterials, Apr. 2011, 6 pages.
Wang et al., Wireless Power Transmission Efficiency Enhancement with Metamaterials, Sep. 2010, 6 pages.
Yu et al., "Wireless Power Transfer in the Presence of Metallic Plates: Experiemental Results", 2013, 10 pages.
European Patent Application No. 14884987.0., Extended European Search Report, dated Jun. 29, 2017, 8 pages.

* cited by examiner

DOWNHOLE POWER AND DATA TRANSFER USING RESONATORS

CROSS-REFERENCE TO RELATED APPLICATIONS

This is a U.S. national phase under 35 U.S.C. 371 of International Patent Application No. PCT/US2014/021097, titled "Downhole Power and Data Transfer Using Resonators" and filed Mar. 6, 2014, the entirety of which is incorporated herein by reference.

TECHNICAL FIELD

The present disclosure relates generally to devices for use in well systems. More specifically, but not by way of limitation, this disclosure relates to downhole power and data transfer using resonators.

BACKGROUND

A well system (e.g., oil or gas wells for extracting fluids or gas from a subterranean formation) can include, among other components, interconnected pipes, valves, or tubes in a wellbore. A well system can further include various sensors for detecting well system characteristics, for example, a pressure sensor for detecting the pressure on a specific well component. Some of these sensors can be downhole and affixed to the various interconnected well components. It can be challenging to transmit power to these interconnected components and sensors downhole.

DETAILED DESCRIPTION

Certain aspects and features of the present disclosure are directed to transferring power and data downhole using resonators. The system can include a first resonator and a second resonator. The second resonator can include a load. The second resonator can be positioned to couple with the first resonator by an evanescent field. The system can further include a metamaterial positioned between the first and second resonators for amplifying or extending a range of the evanescent field between the resonators.

In some embodiments, the first resonator can be positioned on a well string member. Similarly, in some embodiments, the second resonator can be positioned on another well string member. In some embodiments, the well string members can be coupled together. In other embodiments, one well string member can be inside the other well string member.

If power is supplied to the first resonator at or near its resonant frequency, and the first resonator's resonance frequency is close to the second resonator's resonance frequency, evanescent fields from the first resonator can couple with the second resonator. The coupling of the first resonator and the second resonator can cause current to oscillate in the second resonator at the resonant frequency. The current can be delivered to the load, for example a sensor, actuator, motor, or other electronic device, coupled to the second resonator circuit, or can be used to transfer data or information between the resonator circuits.

In one example, a series of interconnected tubes can be deployed in a wellbore. The first resonator can be positioned on an inner tube running the length of the wellbore. The second resonator can be positioned within a few inches of the first resonator on an outer tube running the length of the wellbore. The first resonator and the second resonator can have roughly equal resonance frequencies. The second resonator can include a load that can be, for example, a pressure sensor. A metamaterial can be positioned between the first resonator and the second resonator, for example, on a third tube positioned between the inner tube and the outer tube.

In this example, power can be transmitted to the first resonator. As the first resonator receives the power, evanescent waves are generated around the first resonator. The evanescent waves can interact with the metamaterial, which amplifies the magnitude or extends the range of the evanescent waves. The amplified evanescent waves can stimulate the second resonator, causing current to flow in the second resonator. The current can then be delivered to, in this example, the pressure sensor, which can activate the pressure sensor. The pressure sensor can detect the pressure on the outer tube. Systems according to some embodiments can transmit power between one or more well system components without the need to run a wire between the components.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
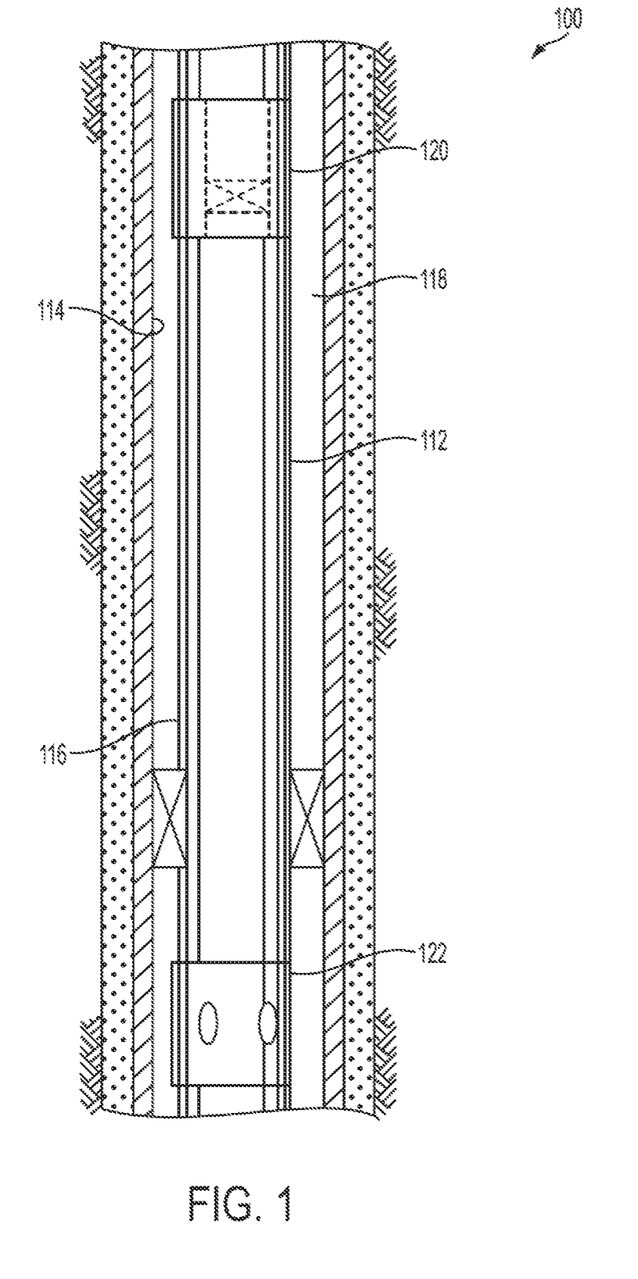
FIG. 1 is a cross-sectional side view of one embodiment of a system for downhole power and data transfer using resonators according to one aspect of the present disclosure.

FIG. 1 is a cross-sectional side view of one embodiment of a system 100 for downhole power and data transfer using resonators according to one aspect of the present disclosure. In this example, the system 100 is a well system (e.g., an oil or gas well for extracting fluids from a subterranean formation). The well system includes a wellbore 114, which includes a tubular string 112. In some embodiments, the wellbore 114 can be cased and cemented, as shown in FIG. 1. In other embodiments, the wellbore 114 can be uncased or the casing may not be cemented. Annulus 118 can be formed between the tubular string 112 and the wellbore 114. The well system can further include well tools 120, 122 (e.g., a safety valve and a production valve, respectively) interconnected to the tubular string 112. In some embodiments, the tubular string 112 can include one or more tubes within it.

A first resonator (not shown) can be positioned on (or within) a well string member and a second resonator (not shown) can be positioned on (or within) the same or a different well string member. For example, in some embodiments, a first resonator can be positioned on the tubular string 112 while the second resonator can be positioned on a well tool 120, 122, on another segment of the tubular string 112, in the annulus 118, or on the wellbore 114 casing. In some embodiments, a metamaterial (not shown) can be disposed between the first and second resonators.

In this example, one or more lines 116 run through the annulus 118 and along the length of the tubular string 112, for example, to communicate power or data to a well system 100 component. In some embodiments, lines 116 can be internal to the tubular string 112. In some embodiments, lines 116 can communicate power or data to a first or second resonator.

Figure 2:
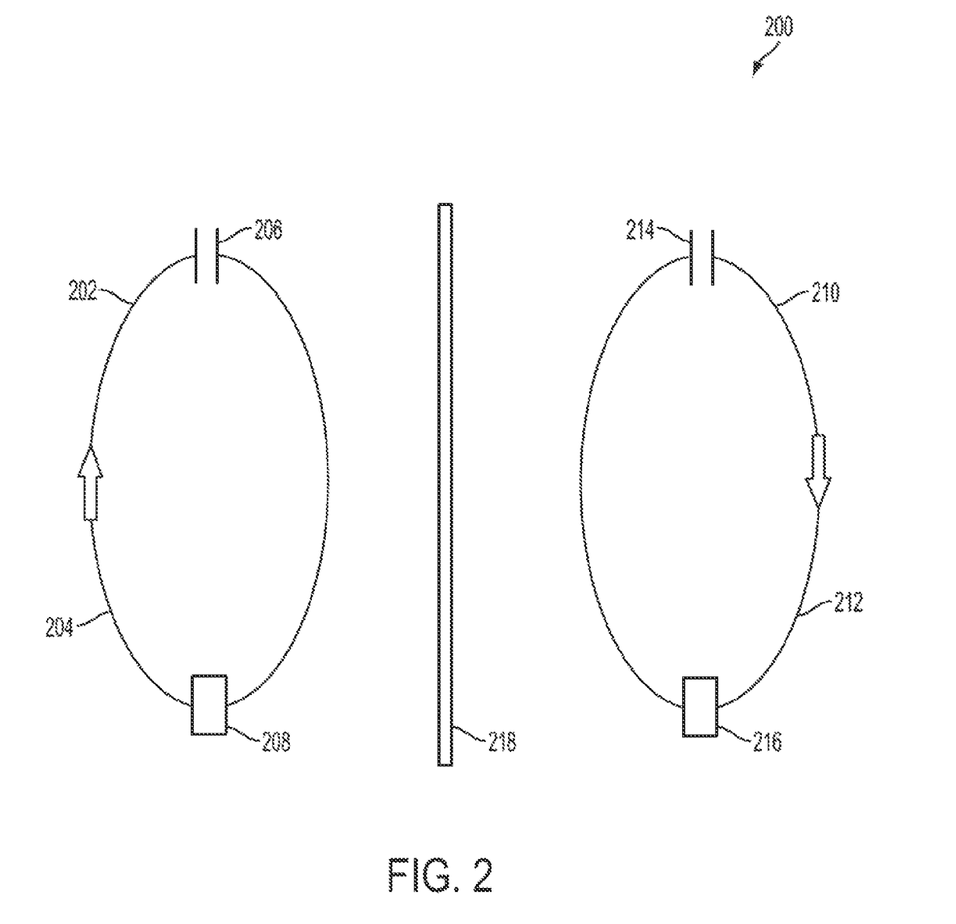
FIG. 2 is a schematic diagram of an embodiment of a system for downhole power and data transfer using resonators according to one aspect of the present disclosure.

FIG. 2 is a schematic view of an embodiment of a system 200 for downhole power and data transfer using resonators according to one aspect of the present disclosure. In this example, system 200 includes a first resonator 202 and a second resonator 210. The first resonator 202 includes an inductor 204 (i.e., a wire loop) that can be connected to a capacitor 206 and a power source 208. In some embodiments, the first resonator 202 may not include a capacitor 206. Further, in this example, the second resonator 210 includes an inductor 212 (i.e., a wire loop) connected to a capacitor 214 and a load 216.

The inductor 204 has an inductance $L_1$ and the capacitor 206 has a capacitance $C_1$. The first resonator 202 thus has a resonant frequency equal to $$f_1 = \frac{1}{2\pi\sqrt{L_1 C_1}}$$

Hz. Likewise, the inductor 212 has a second inductance $L_2$ and a capacitance $C_2$, and therefore the second resonator 210 has a resonant frequency equal to $$f_2 = \frac{1}{2\pi\sqrt{L_2 C_2}}$$

Hz. In some embodiments, the first resonator 202 and the second resonator 210 are tuned to have the same resonant frequency by selecting appropriate inductors 204, 212 and capacitors 206, 214.

In some embodiments, the first resonator 202 can be driven via the power source 208 at its resonant frequency. When the first resonator 202 is driven at its resonant frequency, energy transfers back-and-forth between the inductor 204 and the capacitor 206, generating a magnetic field in the vicinity of the coil and an electric field in the vicinity of the capacitor. The magnetic and electric fields are known as "evanescent fields" because they do not propagate or radiate, but rather decay exponentially with distance from the first resonator. An evanescent wave does not carry energy away from the resonator, unless the evanescent wave couples with the tail of another evanescent wave (e.g., from another resonator).

If both resonators 202, 210 have similar resonant frequencies, are physically near each other (e.g., within a few inches), and the first resonator 202 is driven at resonance from the power source 208, the evanescent field from the first resonator 202 can couple with the second resonator 210. In some embodiments, this evanescent field coupling allows a significant portion of the driven power to be delivered to the second resonator 210, and subsequently to the load 216 coupled to the second resonator 210. The efficiency of the power transfer between the first resonator 202 and the second resonator 210 depends on the load 216, the resonant frequencies of the first resonator 202 and the second resonator 210, the distance between the first resonator 202 and the second resonator 210, and any intervening materials between the first resonator 202 and the second resonator 210.

One or more metamaterials 218 can be positioned between the first resonator 202 and the second resonator 210 to improve power transfer between the resonators 202, 210. A metamaterial 218 is an artificial material made of engineered structures that possess electromagnetic properties not typically found in natural materials, such as negative refraction. Negative refraction is an electromagnetic phenomenon in which electromagnetic waves are refracted at an interface opposite to how the electromagnetic waves would normally be refracted. Negative refraction occurs when electromagnetic waves interface between a regular medium, in which both the electric permittivity ($\in$) and magnetic permeability ($\mu$) are positive, and a metamaterial in which both $\in$ and $\mu$ are negative. A metamaterial with both a negative $\in$ and $\mu$ is sometimes referred to as a "negative-index material" (NIM). With a flat NIM, negative refraction occurs at both the front and back surfaces of the NIM, and electromagnetic waves can propagate inside the NIM, creating a "perfect lens."

Metamaterials can be constructed to have a resonant frequency. If the resonant frequency of the metamaterial is roughly equal to the two resonators, evanescent fields from the first resonator can excite currents to oscillate in the metamaterial. These oscillating currents in the metamaterial generate their own evanescent fields, located a distance from the evanescent field generated by the first resonator, which can excite currents in the second resonator. Thus a metamaterial can be used to extend the effective coupling range of the two resonators.

In some embodiments, the metamaterial 218 can include a magnetic material. Further, in some embodiments, the metamaterial 218 can include a periodic array of apertures in a metallic screen or a periodic array of metallic patches deposited on a dielectric substrate. In some embodiments, the metamaterial 218 can be curved or relatively planar. In some embodiments, the metamaterial 218 can be relatively thin (e.g., 1 mm thick) or the metamaterial 218 can be relatively thick (e.g., 13 mm thick). In some embodiments, the metamaterial 218 can include a cubed lattice structure. In some embodiments, the metamaterial 218 can act like an amplifier, increasing the amplitude of the evanescent waves and/or enhancing the coupling between the two resonators 202, 210.

In some embodiments, the metamaterial 218 can be positioned halfway between the first resonator 202 and the second resonator 210. In other embodiments, the metamaterial 218 can be positioned closer to either the first resonator 202 or the second resonator 210. Further, in some embodiments, there can be two or more metamaterials 218 positioned at various intervals between the first resonator 202 and the second resonator 210.

In some embodiments, data can be transferred between the first resonator 202 and the second resonator 210 by modulating the power transmitted from the power source 208. In some embodiments, as the power transmitted to the first resonator 202 is modulated, the strength of the evanescent wave coupling can change, which can cause the current in the second resonator 210 to be modulated. The modulated current in the second resonator 210 can be associated with data. Thus, data can be transmitted from the first resonator 202 to the second resonator 210 by modulating the power transmitted from the power source 208.

Likewise, the second resonator 210 can transfer data to the first resonator 202 by modulating the impedance of the load 216 in the second resonator 210. In some embodiments, modulating the impedance of the load 216 can cause the current in the second resonator 210 to be modulated, which can cause the strength of the evanescent wave coupling between the first 202 and second 210 resonators to change. As the strength of the coupling between the first 202 and second 210 resonators changes, current in the first resonator 202 can change. In some embodiments, the current in the first resonator 202 can be detected and modulations in the current can be associated with data. Thus, the second resonator 210 can transfer data to the first resonator 202 by modulating its load 216.

In some embodiments, the load 216 can include a motor, an actuator, a sensor, or another electronic device. In some embodiments, the sensor can measure various parameters associated with the wellbore or well system components, for example, pressure, depth, torque, rpm, noise, vibrations, temperature, inclination, orientation, and/or a magnetic field. Further, in some embodiments, the second resonator can be in communication with one or more computing devices or processors for detecting, analyzing, interpreting, storing, or otherwise manipulating data from a sensor, or for modulating the impedance of the load.

In some embodiments, the first resonator 202 can be optically powered. In some embodiments, the first resonator 202 can include an inductor coupled to a photodiode. Power can be transmitted to the first resonator 202 by illuminating the photodiode with light pulses. The photodiode converts the light pulses into energy, allowing the first resonator 202 to receive the transmitted power. In some embodiments, the light pulses can be supplied to the first resonator 202 at the resonant frequency of the second resonator 210. Supplying such light pulses to the first resonator 202 at the resonant frequency of the second resonator 210 can cause an evanescent field to be generated by the first resonator 202, which can couple with the second resonator 210. In some embodiments, this evanescent field coupling allows power and/or data to be transmitted between the resonators 202, 210.

Figure 3:
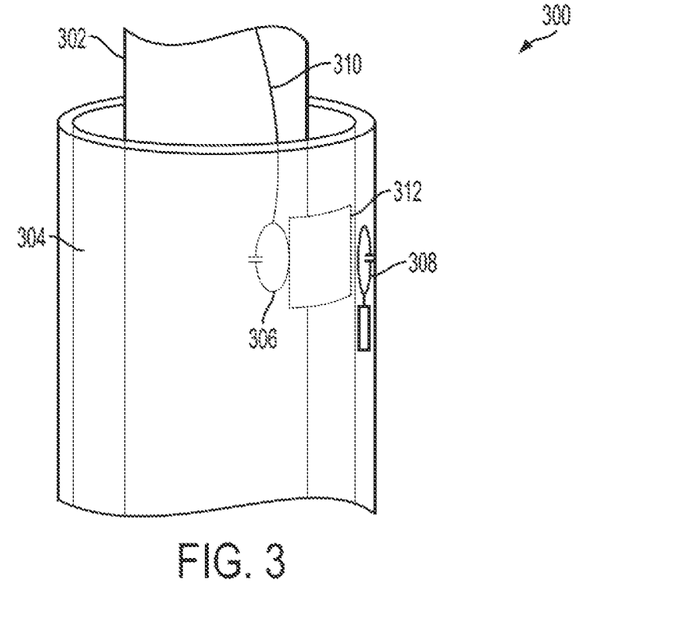
FIG. 3 is a cross-sectional side view of one embodiment of a system for downhole power and data transfer using resonators according to one aspect of the present disclosure.

FIG. 3 is a cross-sectional side view of one embodiment of a system for downhole power and data transfer using resonators according to one aspect of the present disclosure. In this example, the system 300 includes an inner tube 302. A first resonator 306 can be positioned in or on the inner tube 302 and can be coupled to a power source by a wire 310. The power source can be positioned aboveground, on the inner tube 302, or on another well system component. The inner tube 302 can be positioned inside an outer tube 304. The outer tube 304 can include a second resonator 308 coupled to a load.

A metamaterial 312 can be positioned between the first resonator 306 and the second resonator 308. In some embodiments, the metamaterial 312 can include an electrically conductive material, a magnetic material, can be relatively planar or curved in shape, and/or can include a periodic array of apertures. In this example, the metamaterial 312 is curved. Further, in some embodiments, the metamaterial 312 can be positioned on a well string member.

In some embodiments, the metamaterial 312 can be mounted to a well string member, for example inner tube 302, by an insulator.

A power source can supply power to the first resonator 306 via wire 310, which can generate an evanescent field. In some embodiments, the metamaterial 312 can amplify or extend the range of the evanescent field. The second resonator 308 can evanescently couple with the first resonator 306 via the evanescent field, which can cause current to flow in the second resonator 308. The current in the second resonator 308 can be delivered to the load, which can be, for example, a sensor, a motor, or an actuator. In some embodiments, the second resonator 308 can modulate the impedance of the load to transmit data (for example, from a sensor) back to the first resonator 306.

In some embodiments, the first resonator 306 and/or the second resonator 308 can be communicatively coupled to a computing device via a wired or wireless interface. Wireless interfaces can include interfaces such as IEEE 802.11, Bluetooth, or radio interfaces for accessing cellular telephone networks (e.g., transceiver/antenna for accessing a CDMA, GSM, UMTS, or other mobile communications network). Wired interfaces can include interfaces such as RS-232, RS-485, Ethernet, USB, or IEEE 1394. In some embodiments, the computing device can be positioned at the surface of the wellbore. The computing device can include a processor interfaced with other hardware via a bus. A memory, which can include any suitable tangible (and non-transitory) computer-readable medium such as RAM, ROM, EEPROM, EPROM, or the like, can embody program components that configure operation of the computing device. The computing device can further include input/output interface components and additional storage.

In some embodiments, the computing device can detect, analyze, interpret, store, compress (e.g., via lossy or lossless algorithms), or otherwise manipulate data from the first resonator 306 and/or the second resonator 308. In some embodiments, the computing device can modulate the impedance of the load coupled to the second resonator 308 in order to transmit data to the first resonator 306. In some embodiments, the computing device can compress data from the second resonator 308 and modulate the impedance of the load in the second resonator 308 based on the compressed data, thereby transmitting compressed data to the first resonator 306. In some embodiments, transmitting compressed data rather than uncompressed data between the resonators 306, 308 can lead to improved power efficiency of the system 300.

Figure 4:
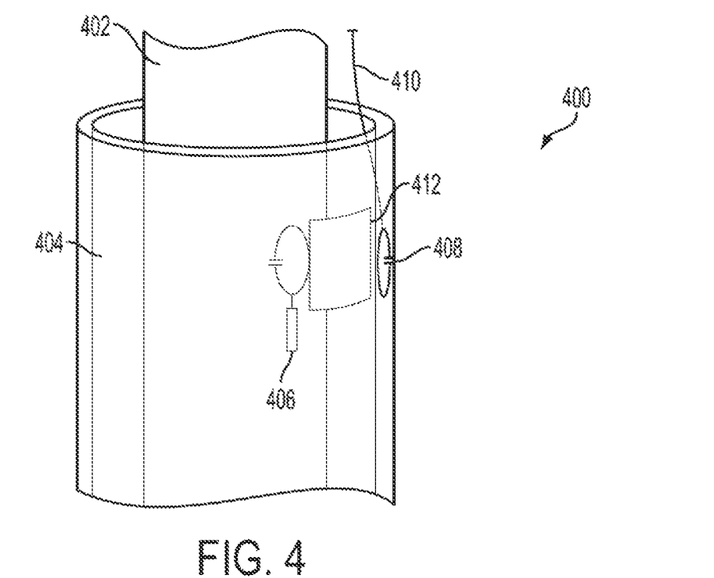
FIG. 4 is a cross-sectional side view of another embodiment of a system for downhole power and data transfer using resonators according to one aspect of the present disclosure.

FIG. 4 is a cross-sectional side view of another embodiment of a system for downhole power and data transfer using resonators according to one aspect of the present disclosure. In this example, the system 400 includes an inner tube 402. The inner tube 402 can include a second resonator 406 coupled to a load. The inner tube 402 can be positioned inside an outer tube 404. The outer tube 404 can include a first resonator 408 that can be coupled to a power source by a wire 410. The power source can be positioned aboveground, on the outer tube 404, or on another well system component.

A metamaterial 412 can be positioned between the second resonator 406 and the first resonator 408. In some embodiments, the metamaterial 412 can include a magnetic material, a cubed lattice structure, and/or a periodic array of apertures on one or more surfaces of the metamaterial 412.

In some embodiments, a power source can transmit power via wire 410 to the first resonator 408, which can generate an evanescent field. In some embodiments, the metamaterial 412 can amplify or extend the range of the evanescent field. The second resonator 406 can evanescently couple with the first resonator 408 via the evanescent field, which can cause current to flow in the second resonator 406. The current in the second resonator 406 can be delivered to the load, which can be, for example, a sensor, a motor, or an actuator. In some embodiments, the second resonator 406 can modulate the impedance of the load to transmit data (for example, from a sensor) back to the first resonator 408.

In some embodiments, the system 400 may include multiple second resonators 406 and/or first resonators 408. The multiple second resonators 406 can have the same or different loads. In some embodiments, one or more metamaterials 412 can be positioned between some or all of the second resonators 406 and the first resonators 208. For example, in some embodiments, a first resonator 208 can be positioned on the outer tube 404, multiple second resonators 406 can be positioned on the inner tube 402, and a metamaterial 412 can be positioned between the first resonator 208 and each of the second resonators 406.

In some embodiments, the multiple second resonators 406 can have resonant frequencies roughly equal to the resonant frequency of a first resonator 408. As power is transmitted to the first resonator 408, an evanescent field can be generated. In some embodiments, metamaterials 412 can amplify or extend the range of the evanescent field. The multiple second resonators 406 can evanescently couple with the first resonator 408 via the evanescent field, which can cause current to flow in the second resonators 406. The current in each of the second resonators 406 can be delivered to each of the second resonator's 406 respective loads.

In some embodiments, a first resonator 408 may not include a capacitor, and thus the frequency of the first resonator's 408 evanescent field can depend on the frequency of a power signal delivered to the first resonator 408. In some embodiments, the evanescent field frequency of the first resonator 408 can be modulated by altering the frequency of the power signal. Such a configuration can be used, in some embodiments, to selectively evanescently couple the first resonator 408 with one or more second resonators 406, thereby selectively transmitting power or data to one or more of the second resonators 406. In some embodiments, the power transmitted to the one or more second resonators 406 can be delivered to each of the second resonator's 406 respective loads.

Figure 5:
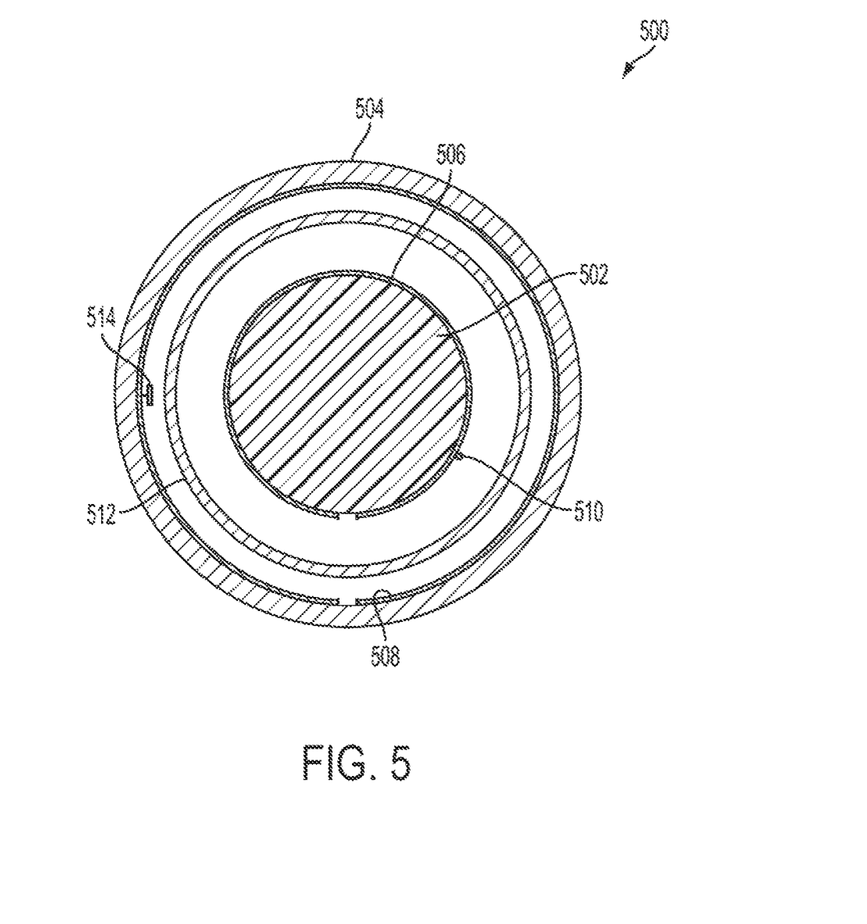
FIG. 5 is a cross-sectional end view of one embodiment of a system for downhole power and data transfer using resonators according to one aspect of the present disclosure.

FIG. 5 is a cross-sectional end view of one embodiment of a system for downhole power and data transfer using resonators according to one aspect of the present disclosure. In this example, the system 500 includes an inner tube 502. The inner tube 502 includes a first resonator 506 that can be coupled to a power source by a wire 510. The power source can be positioned above ground, on the inner tube 502, or on another well system component. The inner tube 502 can be positioned inside an outer tube 504. The outer tube 504 includes a second resonator 508 coupled to a load 514.

In this example, the inductor (i.e., wire loop) associated with the first resonator 506 and the inductor (i.e., wire loop) associated with the second resonator 508 are coaxial within the wellbore. That is, the outer diameter of the first resonator 506 fits within the inner diameter of the second resonator 508. In some embodiments, due to the different diameters of the inner tube 502 and the outer tube 504, the first resonator 506 and the second resonator 508 can have different inductances, because the sizes of the wire loops are different. Accordingly, in some embodiments, in order for the two resonators 506, 508 to have roughly the same resonant frequencies, their respective capacitances must be adjusted so that $L_1 C_1 = L_2 C_2$, where $L_1$ is the inductance of the first resonator 506, $C_1$ is the capacitance of the first resonator 506, $L_2$ is the inductance of the second resonator 508, and $C_2$ is the capacitance of the second resonator 508. In some embodiments, the positions of the first resonator 506 and the second resonator 508 on the tubes 502, 504 can be switched, so that the outer diameter of the second resonator 508 fits within the inner diameter of the first resonator 506.

One or more metamaterials 512 can be positioned between the first resonator 506 and the second resonator 508. In some embodiments, the metamaterial 512 can be cylindrical or curved in shape. In the embodiment shown in FIG. 5, the metamaterial 512 is cylindrical in shape and coaxial within the wellbore, such that it is positioned outside the outer diameter of the first resonator 506 and fits within the inner diameter of the second resonator 508.

In some embodiments, a power source can transmit power via wire 510 to the first resonator 506, which can generate an evanescent field. In some embodiments, a metamaterial 512 can amplify or extend the range of the evanescent field. The second resonator 508 can evanescently couple with the first resonator 506 via the evanescent field, which can cause current to flow in the second resonator 508. The current in the second resonator 508 can be delivered to the load 514, which can be, for example, a sensor, a motor, or an actuator. In some embodiments, the second resonator 508 can modulate the impedance of the load 514 to transmit data (for example, from a sensor) back to the first resonator 506.

Figure 6:
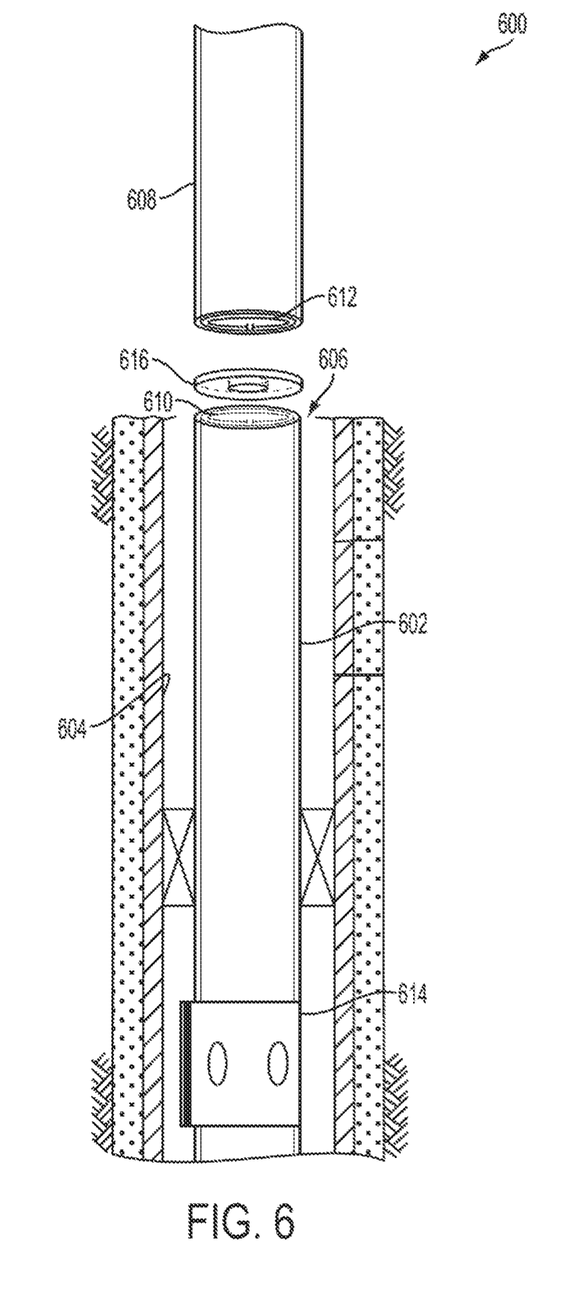
FIG. 6 is a cross-sectional side view of another embodiment of a system for downhole power and data transfer using resonators according to one aspect of the present disclosure.

FIG. 6 is a cross-sectional side view of one embodiment of a system for downhole power and data transfer using resonators according to one aspect of the present disclosure. In this example, the system 600 includes a well string member 608 positioned above a wellbore 604 opening 606. This well string member 608 can include a first resonator 612. Similarly, another well string member 602 can be positioned within the wellbore 604 and can include a second resonator 610. This well string member 602 can be coupled to a well tool 614.

A metamaterial 616 can be positioned between the first resonator 612 and the second resonator 610. In some embodiments, the metamaterial 616 can be in the shape of a circle or a disk, and/or have a hole in the middle. In some embodiments, the metamaterial 616 can be positioned on one or more surfaces of the well string members 608, 602. In other embodiments, the metamaterial 616 may be freestanding between the well string members 608, 602. In some embodiments, the metamaterial 616 can be positioned on yet another well string member (not shown) positioned between the well string members 608, 602 depicted in FIG. 6.

In some embodiments, the wellbore 604 can be below a seabed. In some embodiments, one well string member 608 can be above the seabed surface. A first pressure can be exerted on this well string member 608 by the sea. Another well string member 602 can be below the seabed surface in the wellbore 604 and have a second pressure exerted on it. In some embodiments, the well string members 608, 602 can include pressure housings (not shown) to protect against damage as a result of excessive pressure. In some embodiments, power and/or data can be wirelessly transmitted between the well string members 608, 602 via the first and second resonators 612, 610. Such a configuration can allow for power and/or data transmission between connected or disconnected well string members 608, 602, without impacting the integrity of a pressure housing, as can be the case when a wire is run between the well string members 608, 602 for power and/or data transmission.

Figure 7:
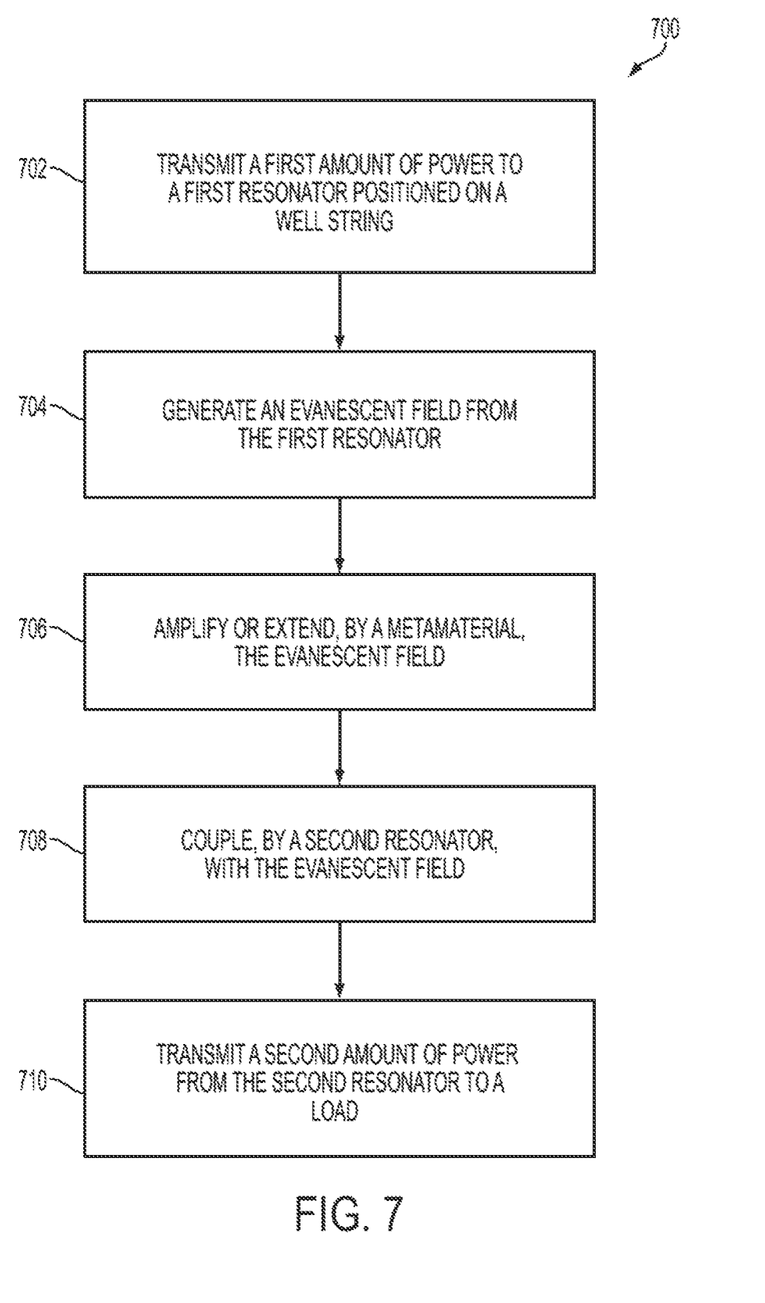
FIG. 7 is an example of a flow chart of a process for downhole power and data transfer using resonators according to one embodiment.

FIG. 7 is an example of a flow chart of a process for downhole power and data transfer using resonators according to one embodiment.

In block 702, a first amount of power is transmitted to a first resonator that can be positioned on a well string. The power can include AC voltage. In some embodiments, the AC voltage can have a frequency that is equal to the resonant frequency of the first resonator. The power can be transmitted to the first resonator via a wire which, in some embodiments, can be positioned on or inside a well string member.

In block 704, the first resonator generates an evanescent field. The evanescent field can be produced at the resonant frequency of the first resonator. The evanescent field decays exponentially with distance from the first resonator.

In block 706, a metamaterial amplifies or extends the evanescent field generated by the first resonator. The amount of amplification can depend on the properties of the metamaterial (e.g., the material and shape of the metamaterial). Further, the distance between the first resonator and the metamaterial, and any intervening materials between the first resonator and the metamaterial, can affect the extension or the amount of amplification of the evanescent field. As distance between the metamaterial and the first resonator increases, the amount in which the evanescent field is extended or amplified decreases.

In block 708, a second resonator is coupled with the evanescent field. The efficiency of the coupling can depend on the resonant frequency of the second resonator, the distance between the metamaterial and the second resonator, and any intervening materials between the metamaterial and the second resonator. As distances between the first resonator, the metamaterial, and/or the second resonator increase, the efficiency of the second resonator's coupling decreases. As the second resonator couples with the evanescent field, current can flow in the second resonator.

In block 710, the second resonator transmits a second amount of power to a load. In some embodiments, the load can include a sensor, an actuator, or a motor. In some embodiments, the sensor can include a temperature sensor, a pressure sensor, an inclinometer, an accelerometer, a gyroscope, a strain gauge, or a magnetometer. Such sensors can be used to determine a temperature, pressure, inclination, acceleration, orientation, strain, or magnetic field, respectively.

In some embodiments, the system 700 can further transmit data from the first resonator to the second resonator by modulating the first amount of power transmitted to the first resonator. Similarly, in some embodiments, the system 700 can transmit data from the second resonator to the first resonator by modulating the impedance of the load coupled to the second resonator. In some embodiments, the system 700 can transmit the data in its original or a compressed form.

In some aspects, a system for downhole data and power transfer using resonators is provided according to one or more of the following examples.

Example #1

A downhole system usable with a well string can include a first resonator positioned on the well string and a second resonator positioned to couple with the first resonator by an evanescent field. The second resonator can include a load. The system can also include a metamaterial positioned between the first resonator and the second resonator for amplifying or extending a range of the evanescent field.

Example #2

The system of Example #1 may feature the first resonator positioned on a first well string member and the second resonator positioned on a second well string member.

Example #3

The system of Example #2 may feature the first well string member positioned above a wellbore and the second well string member positioned in the wellbore.

Example #4

The system of Example #2 may feature the first well string member positioned inside the second well string member. The first resonator can include a first wire loop positioned around a first circumference of the first well string member and the second resonator can include a second wire loop positioned around a second circumference of the second well string member.

Example #5

The system of any of Examples #1-4 may feature the load including an impedance that is variable.

Example #6

The system of any of Examples #1-5 may feature the load including a sensor, an actuator, or a motor.

Example #7

The system of any of Examples #1-6 may feature the metamaterial including a conductive material, and the conductive material including a periodic array of apertures.

Example #8

The system of Example #7 may feature the conductive material further including a magnetic material.

Example #9

The system of any of Examples #1-8 may feature the metamaterial positioned halfway between the first resonator and the second resonator.

Example #10

The system of any of Examples #1-9 may feature the metamaterial being included in a multitude of metamaterials, the multitude of metamaterials positioned between the first resonator and the second resonator.

Example #11

The system of any of Examples #1-10 may feature the metamaterial positioned on a well string member.

Example #12

A downhole system usable with a well string can include a metamaterial positioned between resonators, the resonators positioned on the well string for coupling with each other by evanescent fields.

Example #13

The system of Example #12 may feature the metamaterial including a conductive material, and the conductive material can include a periodic array of apertures.

Example #14

The system of Example #13 may feature the conductive material further including a magnetic material.

Example #15

The system of any of Examples #12-14 may feature the metamaterial being included in a multitude of metamaterials, the multitude of metamaterials positioned between the resonators.

Example #16

A method can include transmitting a first amount of power to a first resonator positioned on a well string, and generating an evanescent field from the first resonator. The method can also include amplifying or extending, by a metamaterial, the evanescent field. Further, the method can include coupling, by a second resonator, with the evanescent field. Finally, the method can include transmitting a second amount of power from the second resonator to a load.

Example #17

The method of Example #16 may feature determining a pressure, temperature, inclination, acceleration, orientation, strain, or magnetic field.

Example #18

The method of any of Examples #16-17 may feature transmitting data from the first resonator to the second resonator by modulating the first amount of power.

Example #19

The method of any of Examples #16-18 may feature transmitting data from the second resonator to the first resonator by modulating an impedance of the load.

Example #20

The method of any of Examples #18-19 may feature compressing the data.

The foregoing description of certain embodiments, including illustrated embodiments, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system for use with a well string, the system comprising:
   a first resonator positioned coaxially about a longitudinal axis of a first well string member for generating an evanescent field at a particular frequency in response to receiving a signal at the particular frequency;
   a second resonator positioned coaxially about a longitudinal axis of a second well string member and entirely below or entirely above the first resonator, the second resonator having a first resonance frequency and being positioned to couple with the evanescent field in response to the particular frequency being the first resonance frequency, wherein the second resonator comprises a first load;
   a third resonator having a second resonance frequency that is different from the first resonance frequency and being positioned to couple with the evanescent field in response to the particular frequency being the second resonance frequency, wherein the third resonator comprises a second load; and
   a metamaterial positioned between the first resonator and at least one of the second resonator or the third resonator, wherein the metamaterial is for amplifying or extending a range of the evanescent field, wherein the metamaterial comprises a conductive material having a periodic array of apertures.

2. The system of claim 1, wherein the first well string member is above a wellbore and the second well string member is in the wellbore.

3. The system of claim 1, wherein the first well string member is inside the second well string member, and wherein the first resonator comprises a first wire loop positioned around a first circumference of the first well string member and the second resonator comprises a second wire loop positioned around a second circumference of the second well string member.

4. The system of claim 1, wherein the first load comprises an impedance that is variable.

5. The system of claim 1, wherein the first load comprises a sensor, an actuator, or a motor.

6. The system of claim 1, wherein the conductive material further comprises a magnetic material.

7. The system of claim 1, wherein the metamaterial is positioned halfway between the first resonator and the second resonator.

8. The system of claim 1, wherein the metamaterial is included in a plurality of metamaterials, the plurality of metamaterials positioned between the first resonator and the second resonator.

9. The system of claim 1, wherein the metamaterial is positioned on a well string member.

10. The system of claim 1, wherein the first load includes a motor.

11. The system of claim 1, wherein the signal comprises optical pulses at the particular frequency.

12. A method, comprising:
    receiving, by a first resonator positioned coaxially about a longitudinal axis of a first well string member, a first signal at a first frequency;
    generating, by the first resonator, a first evanescent field at the first frequency;
    amplifying or extending, by a metamaterial, the first evanescent field, wherein the metamaterial comprises a conductive material having a periodic array of apertures;
    coupling, by a second resonator positioned coaxially about a longitudinal axis of a second well string member and entirely below or entirely above the first resonator, with the first evanescent field at the first frequency;

transmitting, by the second resonator, a first amount of power to a first load;

receiving, by the first resonator, a second signal at a second frequency that is different from the first frequency;

generating, by the first resonator, a second evanescent field at the second frequency;

coupling, by a third resonator, with the second evanescent field at the second frequency; and transmitting, by the third resonator, a second amount of power to a second load.

13. The method of claim 12, wherein the first load is a sensor, and further comprising the sensor determining a pressure, temperature, inclination, acceleration, orientation, strain, or magnetic field in response to receiving the first amount of power.

14. The method of claim 12, wherein the first signal is modulated for transmitting data from the first resonator to the second resonator.

15. The method of claim 12, further comprising transmitting data from the second resonator to the first resonator by modulating an impedance of the first load.

16. The method of claim 15, wherein transmitting the data further comprises compressing the data.

\* \* \* \* \*